Oct. 11, 1938.     E. A. GAST     2,132,465
LAWN TRIMMING DEVICE
Filed Sept. 22, 1936     2 Sheets-Sheet 1

Inventor
Ernest Albert Gast,
By Arthur H. Ewald,
Attorney

Oct. 11, 1938.  E. A. GAST  2,132,465
LAWN TRIMMING DEVICE
Filed Sept. 22, 1936   2 Sheets-Sheet 2
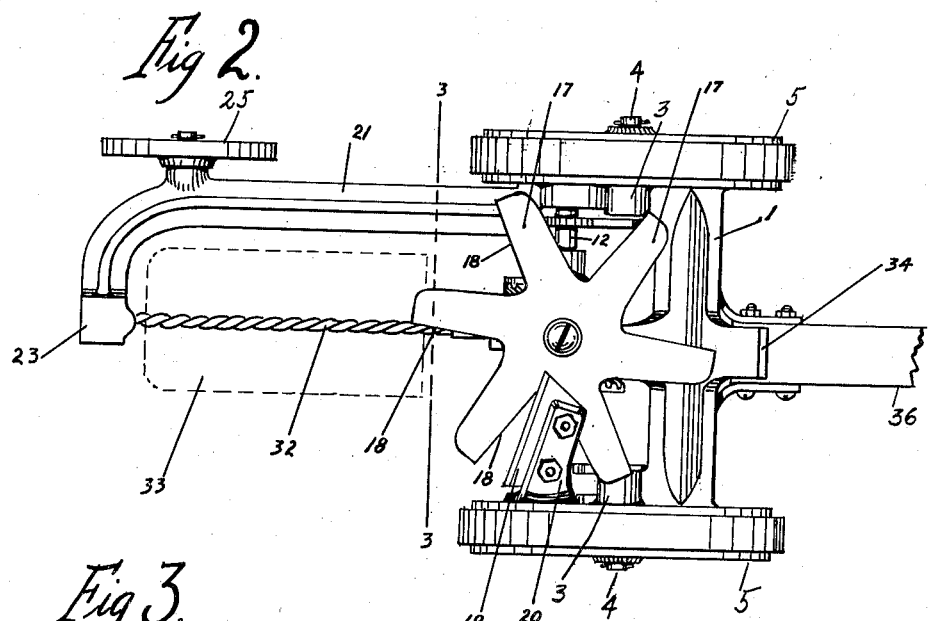
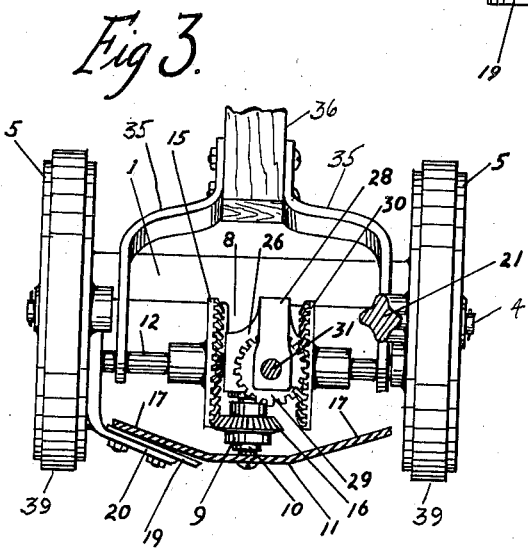
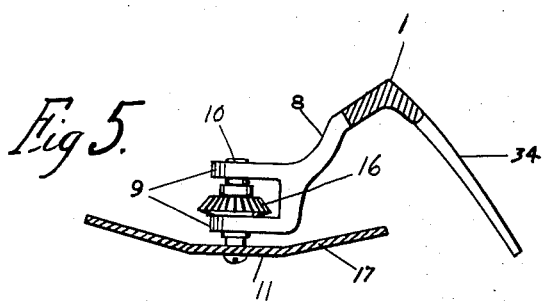
Inventor.
Ernest Albert Gast,
By Arthur H. Ewald,
Attorney.

Patented Oct. 11, 1938

2,132,465

UNITED STATES PATENT OFFICE 2,132,465

LAWN TRIMMING DEVICE

Ernest Albert Gast, Cincinnati, Ohio

Application September 22, 1936, Serial No. 101,987

14 Claims. (Cl. 56—255)

The present invention relates to a device for trimming the edges of a lawn along a sidewalk, curbing, flower-bed or similar area.

The principal object of my invention is to provide an efficient and inexpensive device for the purpose mentioned, the operation of which will produce, with a minimum of expense of time and labor, a clean and neat edge of the grass or similar vegetation along a walk, flower-bed or similar limiting area.

Further objects of my invention will appear from the following detailed description thereof.

In the drawings:

Figure 2 is a bottom view of the device.

Figure 3 is a section on line 3—3 of Figure 2.

Figure 5 is a view of a detail.

Figure 1:
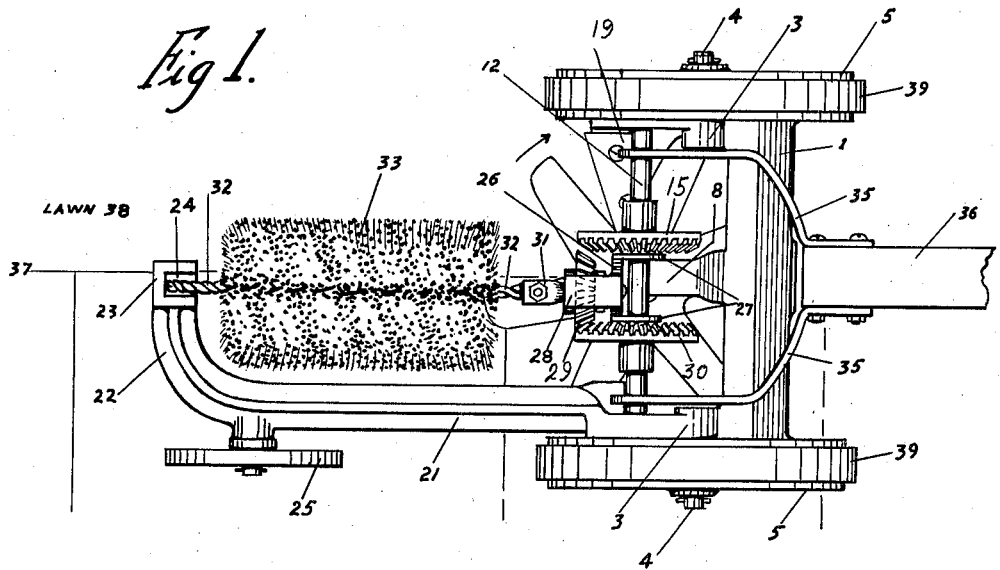
Figure 1 is a plan view of a device constructed in accordance with this invention.
Figure 4:
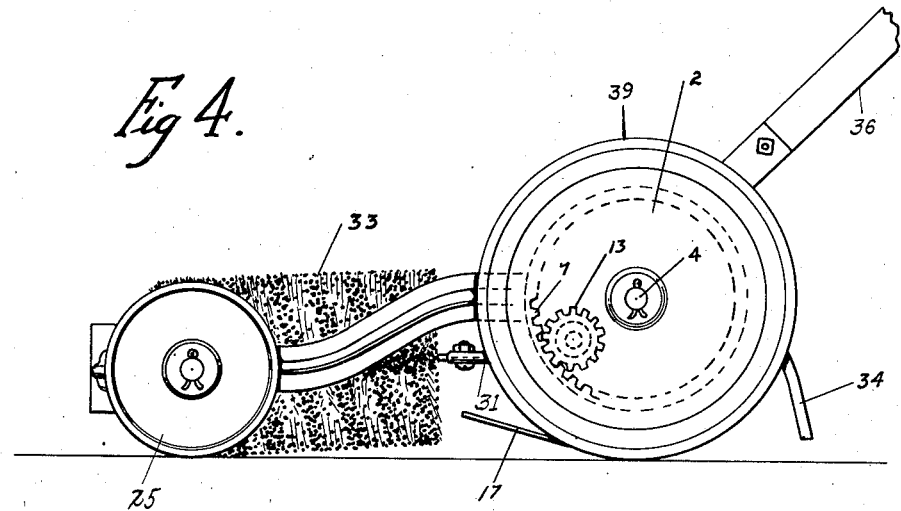
Figure 4 is a side elevation partly in section to illustrate the drive mechanism.

The numeral 1 indicates the main cross member of the frame upon which the various operating elements of my device are assembled. Integrally formed on the ends of the member 1 are circular plates 2, the inner central portions of which are provided with bosses 3—3 for stud shafts 4—4 upon which the main carrying and drive wheels 5—5 are rotatably mounted. The inner sides of the wheels 5—5 are provided with circular recesses of slightly larger diameter than the plates 2—2 so that the wheels may fit over and rotate around said plates. The recesses are provided with internal gears 7.

The frame member 1 has integrally formed therewith a forwardly and downwardly extending bracket member 8, which terminates in horizontal bifurcations 9—9 which serve as bearings for a short shaft 10, on the lower end of which a rotatory cutter 11 is secured. The shaft 10 is adapted to slide vertically in said bearings. Mounted in bearings in the plates 2—2 in front of the frame member 1 is a transverse shaft 12 upon the ends of which pinions 13 are fixedly secured. The pinions 13, intermesh with the internal gears 7 in the wheels 5 which are mounted on the studs 4, so that upon rotation of the wheels the transverse shaft 12 is driven. Fixedly secured on the shaft 12 is a bevel gear 15, which intermeshes with a bevel pinion 16 secured on the shaft 10 between the bifurcations 9—9. Rotation of the wheels 5—5 is thus arranged to drive the cutter 11.

The cutter 11 is provided with a plurality of blades 17, the cutting edges 18 of which are adapted to co-act with the edge of a stationary cutter 19 mounted on a bracket 20 which is integrally formed with the inner face of one of the plates 2—2. As shown in Figure 3 the blades 17 of the cutter are disposed in an oblique upward direction. The cutter 19 is disposed in a similar oblique direction on the bracket 20; however, the angle of inclination of the blades 17 from the horizontal is slightly less than that of the fixed blade 19, whereby there is a sharp angle of contact between the respective blades 17 and the blade 19 as the cutter 11 rotates causing a shearing action between the moving and fixed blades; this shearing rotation involves, of course, a slight vertical displacement of the rotary cutter which is accommodated by longitudinal sliding movements of the shaft 10 in its bearings in the bifurcations 9—9. The movable blades are furthermore maintained in effective shearing contact with the fixed blade by the downward component of force during rotation of the drive gear 15 upon the driven gear 16. This downward component of force not only maintains effective shearing contact between the blades but also effects the automatic adjustment of the respective blades to take care of wear and other conditions.

Integrally formed with the plate 2, opposite the plate supporting bracket 20, is an arm 21 the free end 22 of which curves inwardly and is provided with a rectangular head 23 which contains a pocket 24 the top and rear sides of which are open. Rotatably mounted on the arm 21 near its free end is a wheel 25 which serves as a support for the arm during operation of the device.

A bracket 26 is movably mounted on the transverse shaft 12 by means of perforations in bifurcations 27. The bracket 26 has a rectangular head 28 between the front and rear walls of which a bevel gear 29 is rotatably mounted. The bevel gear 29 intermeshes with a bevel gear 30 fixedly mounted on the drive shaft 12. Secured to the shaft 31 of bevel gear 29 is the shaft 32 of a cylindrical brush 33. The free end of shaft 32 rests in the pocket 24 of head 23 which serves as a bearing therefor supporting the brush 33 in front of the movable cutters 17. By reason of the movable mounting of bracket 26 on the shaft 12 the brush 33 is permitted a limited up and down movement; during operation, however, the downward component of force of the drive gear 30 applies a moderate downward pressure to the brush so as to maintain it in contact with a surface over which it is passing for the purpose hereinafter set forth.

The rear portion of the frame member 1 is provided with a support 34 upon which the device rests when it is not in operation. Handle brackets 35—35 are loosely mounted on the transverse shaft 12 and serve as a means for the attachment of an operating handle 36.

The operation of my device is as follows: In Figure 1 the line 37 indicates the edge of a sidewalk along which the lawn 38 is being trimmed. The drive wheels 5, which may be provided with rubber tires 39 for the purpose of traction, are located so as to straddle the edge to be trimmed, the left hand drive wheel riding upon the pavement and the other upon the lawn. Should there be any great unevenness the operator may, of course, support the device so as to ride effectively only upon the wheel which is on the pavement. The rotation of the drive wheels actuates the cutting blades 17 in the direction of the arrow in Figure 1; this is accomplished by means of the bevel gears 15 and 16. As the mechanism proceeds forwardly the rotating cutter blades thus engage the grass and bring it into contact with the fixed cutter blades where the shearing action of the respective blades severs it. While the rotating cutter 17 may be fairly close to the pavement the edge of which is to be trimmed, there will frequently be grass which lies flat and which without some means of pick-up would not be engaged by the cutters. This pick-up is accomplished by means of the cylindrical brush 33 which rotates in a direction opposite to the rotation of the cutters 17. The brush 33 is so disposed as to pass over in contact with the pavement and the rotation of said brush by means of gears 30 and 29 serves to pick up the grass and carry it into the path of the rotating cutters.

Having thus fully described my invention, what I claim as new and desire to secure by Letters Patent is:

1. A trimming device of the character specified comprising a frame, a fixed cutter carried by said frame, a movable cutter carried by and arranged to rotate on a vertical axis slidable in said frame, said movable cutter being arranged to be supported vertically by said fixed cutter, a wheel on which said frame is adapted to ride and means whereby said movable cutter is actuated by the rotation of said wheel to make shearing contacts with said fixed cutter.

2. A trimming device of the character specified comprising a frame, a fixed cutter carried by said frame, a movable cutter carried by and arranged to rotate on a vertical axis slidable in said frame, said movable cutter being arranged to be supported by said fixed cutter, means whereby said movable cutter is actuated by the movement of said frame to make shearing contacts with said fixed cutter, a non-cutting member movably mounted in said frame, a wheel on which said frame is adapted to ride and means for the actuation of said member by the rotation of said wheel whereby objects to be cut are moved into the path of movement of said movable cutter.

3. A trimming device of the character specified comprising a frame, wheels mounted on said frame and arranged to carry same, a fixed cutter carried by said frame, a movable cutter carried by and arranged to rotate on a vertical axis slidable in said frame, said movable cutter being arranged to be supported vertically by said fixed cutter, and means whereby said movable cutter is actuated by the rotation of said wheels to make shearing contacts with said fixed cutter.

4. A trimming device of the character specified comprising a frame, a fixed cutter carried by said frame, a movable cutter carried by and arranged to rotate on a vertical axis slidable in said frame, said movable cutter comprising a plurality of radial blades, said movable cutter being arranged to be supported vertically by said fixed cutter, a wheel on which said frame is adapted to ride and means whereby said movable cutter is actuated by the rotation of said wheel to cause said blades successively to make shearing contacts with said fixed cutter.

5. A trimming device of the character specified comprising a frame, a fixed cutter carried by said frame, a movable cutter carried by and arranged to rotate on a vertical axis slidable in said frame, said movable cutter comprising a plurality of radial blades, said movable cutter being arranged to be supported vertically by said fixed cutter, a wheel on which said frame is adapted to ride, means whereby said movable cutter is actuated by the rotation of said wheel to cause said blades successively to make shearing contacts with said fixed cutter, a non-cutting member movably mounted in said frame, and means for the actuation of said member by the movement of said frame, whereby objects to be cut are moved into the path of rotation of said radial blades.

6. A trimming device of the character specified comprising a frame, wheels mounted on said frame and arranged to carry same, a fixed cutter carried by said frame, a transverse shaft rotatably mounted in said frame, means whereby the rotation of said wheels is arranged to actuate said shaft, a vertical shaft rotatably and slidably mounted in said frame under said transverse shaft, intermeshing bevel gears fixedly mounted on said transverse and vertical shafts, whereby the former is arranged to drive the latter, and a movable cutter secured on the lower end of said vertical shaft and arranged during rotation to be supported vertically on and to make shearing contacts with said fixed cutter.

7. A trimming device of the character specified comprising a frame, wheels mounted on said frame and arranged to carry same, a fixed cutter carried by said frame, a transverse shaft rotatably and slidably mounted in said frame, means whereby the rotation of said wheels is arranged to actuate said shaft, a vertical shaft rotatably mounted in said frame under said transverse shaft, intermeshing bevel gears fixedly mounted on said transverse and vertical shafts, whereby the former is arranged to drive the latter, a movable cutter secured on the lower end of said vertical shaft and arranged during rotation to be supported vertically on and to make shearing contacts with said fixed cutter, a non-cutting member movably mounted in said frame, and means for the actuation of said member by the movement of said frame, whereby objects to be cut are moved into the path of rotation of said movable cutter.

8. A trimming device of the character specified comprising a frame, wheels mounted on said frame and arranged to carry same, a fixed cutter carried by said frame, a transverse shaft rotatably mounted in said frame, means whereby the rotation of said wheels is arranged to actuate said shaft, a vertical shaft rotatably and slidably mounted in said frame under said transverse shaft, intermeshing bevel gears fixedly mounted on said transverse and vertical shafts, whereby the former is arranged to drive the latter, and a movable cutter secured on the lower end of said vertical shaft, said movable cutter comprising a plurality of radial blades which are arranged during rotation to be supported vertically on and successively to make shearing contacts with said fixed cutter.

9. A trimming device of the character specified comprising a frame, wheels mounted on said frame and arranged to carry same, a fixed cutter carried by said frame, a transverse shaft rotatably mounted in said frame, means whereby the rotation of said wheels is arranged to actuate said shaft, a vertical shaft rotatably and slidably mounted in said frame under said transverse shaft, intermeshing bevel gears fixedly mounted on said transverse and vertical shafts, whereby the former is arranged to drive the latter, a movable cutter secured on the lower end of said vertical shaft, said movable cutter comprising a plurality of radial blades which are arranged during rotation to be supported vertically on and successively to make shearing contacts with said fixed cutter, a non-cutting member movably mounted in said frame, and means for the actuation of said member by the movement of said frame whereby objects to be cut are moved into the path of rotation of said radial blades.

10. A trimming device of the character specified comprising a frame, wheels mounted on said frame and arranged to carry same, a fixed cutter carried by said frame and disposed in an oblique plane, a transverse shaft rotatably and slidably mounted in said frame, means whereby the rotation of said wheels is arranged to actuate said shaft, a vertical shaft rotatably mounted in said frame under said transverse shaft, intermeshing bevel gears fixedly mounted on said transverse and vertical shafts whereby the former is arranged to drive the latter, and a movable cutter secured on the lower end of said vertical shaft, said movable cutter comprising a plurality of radial blades, said blades being disposed in a plane slightly less oblique than said fixed cutter and being arranged during rotation to be supported vertically on and successively to make shearing contacts with said fixed cutter.

11. A trimming device of the character specified comprising a frame, wheels mounted on said frame and arranged to carry same, a fixed cutter carried by said frame and disposed in an oblique plane, a transverse shaft rotatably mounted in said frame, means whereby the rotation of said wheels is arranged to actuate said shaft, a vertical shaft rotatably and slidably mounted in said frame under said transverse shaft, intermeshing bevel gears fixedly mounted on said transverse and vertical shafts whereby the former is arranged to drive the latter, a movable cutter secured on the lower end of said vertical shaft, said movable cutter comprising a plurality of radial blades, said blades being disposed in a plane slightly less oblique than said fixed cutter and being arranged during rotation to be supported vertically on and successively to make shearing contacts with said fixed cutter, and a non-cutting member movably mounted in said frame, and means for the actuation of said member by the movement of said frame, whereby objects to be cut are moved into the path of rotation of said radial blades.

12. A trimming device of the character specified comprising a frame, wheels mounted on said frame and arranged to carry same, a fixed cutter carried by said frame, a transverse shaft rotatably mounted in said frame, means whereby the rotation of said wheels is arranged to actuate said shaft, a vertical shaft rotatably and slidably mounted in said frame under said transverse shaft, intermeshing bevel gears fixedly mounted on said transverse and vertical shafts, whereby the former is arranged to drive the latter, a movable cutter secured on the lower end of said vertical shaft and arranged during rotation to be supported vertically on and to make shearing contacts with said fixed cutter, a bracket loosely mounted on said transverse shaft, a third shaft rotatably mounted in said bracket, intermeshing bevel gears mounted respectively on said transverse and third shafts, whereby the latter is driven in reverse direction to the rotation of said vertical shaft, a brush operatively secured to said third shaft in front of said movable cutter, whereby upon rotation of said brush objects to be cut are moved into the path of said movable cutter, and means for supporting the free end of said brush.

13. A trimming device of the character specified comprising a frame, wheels mounted on said frame and arranged to carry same, a fixed cutter carried by said frame, a transverse shaft rotatably mounted in said frame, means whereby the rotation of said wheels is arranged to actuate said shaft, a vertical shaft rotatably and slidably mounted in said frame under said transverse shaft, intermeshing bevel gears fixedly mounted on said transverse and vertical shafts, whereby the former is arranged to drive the latter, a movable cutter secured on the lower end of said vertical shaft, said movable cutter comprising a plurality of radial blades which are arranged during rotation to be supported vertically on and successively to make shearing contacts with said fixed cutter, a bracket loosely mounted on said transverse shaft, a third shaft rotatably mounted in said bracket, intermeshing bevel gears mounted respectively on said transverse and third shafts, whereby the latter is driven in reverse direction to the rotation of said vertical shaft, a brush operatively secured to said third shaft in front of said movable cutter, whereby upon rotation of said brush objects to be cut are moved into the path of said movable cutter, and means for supporting the free end of said brush.

14. A trimming device of the character specified comprising a frame, wheels mounted on said frame and arranged to carry same, a fixed cutter carried by said frame and disposed in an oblique plane, a transverse shaft rotatably mounted in said frame, means whereby the rotation of said wheels is arranged to actuate said shaft, a vertical shaft rotatably and slidably mounted in said frame under said transverse shaft, intermeshing bevel gears fixedly mounted on said transverse and vertical shafts whereby the former is arranged to drive the latter, a movable cutter secured on the lower end of said vertical shaft, said movable cutter comprising a plurality of radial blades, said blades being disposed in a plane slightly less oblique than said fixed cutter and being arranged during rotation to be supported vertically on and successively to make shearing contacts with said fixed cutter, a bracket loosely mounted on said transverse shaft, a third shaft rotatably mounted in said bracket, intermeshing bevel gears mounted respectively on said transverse and third shafts, whereby the latter is driven in reverse direction to the rotation of said vertical shaft, a brush operatively secured to said third shaft in front of said movable cutter, whereby upon rotation of said brush objects to be cut are moved into the path of said radial blades, and means for supporting the free end of said brush.

ERNEST ALBERT GAST.